(12) United States Patent
Kappel et al.

(10) Patent No.: US 6,407,864 B1
(45) Date of Patent: Jun. 18, 2002

(54) AUTOMATED SYSTEM FOR TESTING TWO DIMENSIONAL DETECTOR ARRAYS AND OPTICAL SYSTEMS USING SEQUENTIAL FILTERS

(76) Inventors: David W. Kappel, 4834 Lehrer Dr., San Diego, CA (US) 92117; Arash Ghorbani, 3028 Ferncrest Pl., Thousand Oaks, CA (US) 91362; Arnold Daniels, 1380 Oak Trails St., Thousand Oaks, CA (US) 91320

( * ) Notice: Subject to any disclaimer, the term of this patent is extended or adjusted under 35 U.S.C. 154(b) by 0 days.

(21) Appl. No.: 09/549,385

(22) Filed: Apr. 14, 2000

(51) Int. Cl.⁷ .............................. G02B 13/20; G02B 5/02
(52) U.S. Cl. ...................... 359/599; 359/364; 359/772; 359/776; 359/800; 362/293
(58) Field of Search ................................ 359/579, 364, 359/503, 772, 774, 775, 776, 778, 779, 781, 783, 798, 800; 348/187, 188, 189; 362/268, 293, 280, 281–284, 311

(56) References Cited

U.S. PATENT DOCUMENTS

| | | | |
|---|---|---|---|
| 4,800,474 A | * | 1/1989 | Bornhorst .................... 362/293 |
| 5,497,234 A | | 3/1996 | Haga |
| 5,612,797 A | | 3/1997 | Clarke |
| 5,956,106 A | | 9/1999 | Petersen et al. |
| 6,191,891 B1 | * | 2/2001 | Pellicori ..................... 359/599 |

* cited by examiner

Primary Examiner—Cassandra Spyrou
Assistant Examiner—Leo Boutsikaris
(74) Attorney, Agent, or Firm—Curtis L. Harrington (57) ABSTRACT

An automatic testing illumination system has advantages of speed, quick calibration ability and therefore high accuracy over conventional illuminators. An spherical light source/concentrator exit port is rapidly and sequentially covered by at least one automated device for affecting the light leaving the exit port. Automation enables a very rapid sequencing of light onto a two or three dimensional array to cut the time for test and evaluation, and to permit very accurate calibration of the illuminator system.

17 Claims, 5 Drawing Sheets

AUTOMATED SYSTEM FOR TESTING TWO DIMENSIONAL DETECTOR ARRAYS AND OPTICAL SYSTEMS USING SEQUENTIAL FILTERS

FIELD OF THE INVENTION

This application relates to the field of self contained, portable machines and test equipment for optical detectors, such as CCD and CMOS imaging devices, and more particularly to an automated, compact, efficient illumination system for use with a small integrating sphere which produces light having high spatial uniformity, high resolution MTF target to be used for characterizing the resolution of pixelized devices under test.

BACKGROUND OF THE INVENTION

One of the fastest growing segments of the electro-optic art involves the use of photo electric detector arrays used in cameras and detectors for consumers, machine imaging and inspection imaging. The advancement in this area has been so extensive and so rapid at the technically advanced side of the market that the technology has enabled individually owned electronic cameras to begin to supplant cameras which use film and chemical development. The more technical side of the electronic imaging industry continues to advance and demands ever increasing sensitivity to produce a product of ever increasing quality. Increased affordability is had through mass production and the lowering of production costs while keeping the product quality high. High product quality is absolutely dependent upon high level testing.

To consider a simple electronic camera as an example, the main component is a two dimensional electronic array, typically a silicon-based device having thousands of pixels of a size less than 20 micrometers each. In more advanced applications, the array may be a three dimensional electronic array having an ability to make further measurements on light waves which may have penetrated the surface and which may have interfered with each other, for example. The remaining parts of the camera are far less critical and include a lens, a focusing system for physically moving the lens, and computer memory storage. The quality and suitability of the two dimensional detector array will determine whether the camera will function properly. As it is the most expensive and critical component in the camera, if it is defective, the camera as a whole is virtually worthless. Further, if the optical chip can be identified as rejected or accepted at an early stage of manufacture, before further assembly costs, significant efficiency and cost savings can be attained.

The critical need is therefore to properly test two dimensional arrays with as much speed and accuracy as possible to eliminate the defective components very early in the manufacturing process, at each stage before additional value can be added. Quality control is of paramount importance in the products which use two dimensional detector arrays, but even the tightest production and quality testing program cannot achieve its goals without the very most efficient test equipment. This problem is significant for low end products like ordinary digital cameras, but it is acute for high end and specialty two dimensional array products. Commercially available test illuminators can produce uniform illumination so long as the integrating sphere is large, significantly larger than the area occupied by the arrays to be tested.

Integrating spheres as commonly used have as their purpose the production of a uniform light source. The larger the integrating sphere, the more uniform light source produced. However, larger integrating spheres which overlie two dimensional arrays are more bulky to operate. Many of the smaller integrating spheres often fail to produce enough uniformity in illumination and do not provide uniform coverage over areas larger than about 24 square millimeters. Currently available illumination test equipment fails to give the greatest efficiency both because of failure in spatial illumination and uniformity and because of losses in illumination intensity resulting in inefficiency.

Testing is critical for several reasons. Any further work done on the two dimensional array if it is defective represents both lost time and lost material. Further, the average reasonable number of tests available for a given array are likely to be large in number and to additionally be dependent upon a specific set of testing criteria for the composition of the array, the intended use environment for the array or both. As such, doing really excellent testing translates into a really burdensome time and effort cost.

What is therefore needed is a test system which can perform intensive testing of a wide variety of two dimensional arrays, to simulate a further wide variety of operational environments to insure that arrays chosen for further processing are as close to perfect as the intended device requires.

The theory behind the operation and use of an integrator begins with the fact that proper evaluation of the functional performance of large two dimensional detector arrays for camera vision requires spatially uniform levels of illumination. Further, filtering and test patterns may be applied to test two dimensional arrays in an attempt to find even the smallest defect in the array. Commercially available simple test illuminators are low in efficiency, large, and bulky, and require an entry setup and calibration for each array tested. Existing illuminators have achieved spatial uniformity approaching a one percent variance taken over a rather small illuminating area. This value is unacceptable where high quality and very tight production control is essential. Without more, the use of a spherical integrator to attempt to statistically randomize the distribution of illumination is simply insufficient. Such conventional reflecting spheres attempt to provide a uniform nearly ideal distribution of light, known as Lambertian distribution, where the reflected intensity is substantially independent of the angle of incidence. However, commercially available test illuminators are low in efficiency, large and bulky and do not provide uniform illumination coverage over the minimum required coverage area. The output or reflective efficiency is a function of the overall area occupied by the radiating lamp, and may be difficult to control. Given this low level of efficiency, attempted compensation requires the use of a very high wattage lamp to power the illumination test system. A heating problem is thus created since about 80% of the energy going into the bulb is given off as waste heat which needs to be dissipated. Heat dissipation by providing openings in the sphere decrease would decrease its efficiency even further. A pure air ventilation system to compensate for the heat load would probably require refrigeration in order to work optimally. Resulting temperature changes from heating will introduce error into the two dimensional array measurement.

Where the wall is depended upon for providing the spatial uniformity, the disadvantages are cost, large size and bulk and especially the waste heat energy which is not only a problem in itself, but as a source of error as stray light which can in an unwanted manner heat the two dimensional array.

It is desirable to provide a relatively smaller beam cross section so that the homogeneity can be controlled. In the needed integrating sphere system it would be necessary to provide additional optics to accommodate economical filter sizes, and to provide for automated testing. A structure is needed which is portable, efficient, stable, compact and which can in an automated way test thousands of arrays in the minimum time.

SUMMARY OF THE INVENTION

A structure and system is provided for both avoiding the limitations on the currently available test devices and providing a source of uniform illumination that is compact, efficient and portable, and employing it in a wide variety of test set ups. The advantage to this structure and process, and overall approach is that a relatively cheap, fast, and compact illuminator can be manufactured and which will be so automated that it can be self tested through a high number of data points for a given array, as well as characterize a high number of arrays of one type and then be altered to test a completely different array in a matter of minutes. A light source uses a sphere to create a stream of uniform light through an exit aperture or exit port. A pair of motor driven filter wheels are mounted in front of the exit aperture or exit port along with a motor driven target slide. Control electronics are housed within the same housing as the sphere and provide rapid control for the filter wheels and exit aperture.

The advantage of the concept is both forward and reverse oriented. A known test array having known characteristics can be used to calibrate the expected results in order to get a real time indication of the performance and state of the illuminator. Once performance characteristics have been established, a level of performance may be specified before introduction of the two-dimensional arrays to be tested. The mass testing of arrays may then begin. After a reasonable period of time, the test array can be reintroduced to insure that no defects in the illuminator have developed from either changes in the illumination source, heat, or variations in power, and the like. As a result, consistency is assured.

During the test, light from the elliptical light source/ concentrator is directed through a field homogenizer & shutter, and then through controlled position spectral filter and attenuation wheels, such individual filter and attenuation materials may be commonly commercially available. The spectral filter & attenuation wheels are driven by a filter wheel/shutter drive controller. Light directed through the field homogenizer & shutter, and spectral filter and attenuation wheel is thus further smoothed of its spatial unevenness, before being directed through a lens transfer system to then produce uniform pupil irradiance.

The light source is preferably a high temperature tungsten halogen lamp or quartz halogen. The lamp can be chosen from commercially available lamps and is preferably positioned at one focus of a sphere.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the invention will be best described with reference to FIG. 1 which illustrates an automatic illumination testing system 11. A housing 13 is seen to include an integrating sphere 15 and associated electronics 17 located adjacent the sphere section 15. The integrating sphere 15 is preferably about six inches in diameter and may be commercially available from Labsphere, Inc. The front of the automatic illumination testing system 11 includes an exit aperture opening 19 from which light generated from the sphere section 15 leaves the housing 13. The exit aperture opening 19 may have a circular diameter of about one and a half inches. As closely adjacent the aperture opening 19 as possible is a target slide 21 operated by an actuation motor 23. The target slide 21 is seen as a vertically mounted target slide, but a different embodiment will also be shown later. The target slide 21 has an upper clear or through aperture 25, and a lower test pattern aperture 27. The test pattern aperture can be laser cut or have etched images positioned to produce a test pattern of sufficient sharpness and clarity for testing. The ability of a two-dimensional array to reproduce the test pattern is one measure of its level of perfection.

To one side of the aperture opening 19 a first wheel 31 is pivotally mounted to the housing 13, and first wheel 31 may preferably be one of a neutral density filter or frequency filter or a combination of both. The term "frequency filter" is a general term herein and includes frequency selective filters which may include band pass, high pass, low pass, low stop, high stop and band stop filters. First wheel 31 is powered by a first friction drive motor 33 having a drive wheel 35 engaging an outwardly disposed rim 37 of the first wheel 31. The first wheel 31 may have a radius of about 3.250 inches to enable positioning a series of about six one inch radius apertures 39.

To the other side of the aperture opening 19 a second wheel 41 is pivotally mounted to the housing 13, and second wheel 31 may also preferably be one of a neutral density filter or frequency filter or a combination of both. Second wheel 41 is seen positioned at the front of and slightly overlapping first wheel 31. Second wheel 41 is powered by a second friction drive motor 43 having a drive wheel 45 engaging an outwardly disposed rim 47 of the second wheel 41. The second wheel 41 may also have a radius of about 3.250 inches to enable positioning a series of about six one inch radius apertures 49, but may differ so long as the through transmissive properties of the first and second wheels 31 and 41 are not compromised.

Light emanating from the aperture opening 19 and which has an opportunity to propagate beyond the target slide 21, and first and second wheels 31 and 41 enter a lens transfer system 51 and including a first lens 53, second lens 55, variable aperture 57, third lens 59, and fourth lens 61.

The first lens 53, when operating with 1.5 inch diameter evenly illuminated exit port or exit aperture opening 19 may preferably have an edge diameter of about sixty millimeters, a circular aperture diameter of from about 27.2 millimeters to about 29.0 millimeters, and a thickness of about 18 millimeters. It may have a coating for enhanced transmission of from four hundred to one thousand nanometers. The concave radius is about 234.5 millimeters and opposes a convex radius of about 68.9 millimeters.

The second lens 55 is a doublet combination of a double concave lens portion cemented to a double convex lens portion. Second lens 55 has an edge diameter of about 44.0 millimeters, a set of circular aperture diameters of 14.5, 17.41, and 20.4 millimeters. The outer of the double concave surfaces had a concave radius of 17.55 millimeters. The concave surface matching the convex surface of the double convex portion has a same radius of about 167.8 millimeters. The free convex end of the double convex portion has a radius of 31.4 millimeters. The double convex portion lies more adjacent the first lens 53 while the double concave portion lies on the other side and toward the variable aperture 57. The variable aperture 57 can assume an opening size of from about one inch in diameter to fully shut.

The third lens 59 lies on the other side of the variable aperture 57 and also is a doublet combination of a double concave lens portion cemented to a double convex lens portion. Third lens 59 has an edge diameter of about 48.0 millimeters and a set of circular aperture diameters of 13.1, 19.8, and 23.3 millimeters. The outer of the double concave surfaces has a concave radius of 17.55 millimeters. The concave surface matching the convex surface of the double convex portion has a same radius of about 167.8 millimeters. The free convex end of the double convex portion has a radius of 31.4 millimeters. The double concave portion lies more adjacent variable aperture 57 while the double convex portion lies on the other side and toward the fourth lens 61.

The fourth lens 61, may preferably have an edge diameter of about sixty millimeters, a circular aperture diameter of from about 30.6 millimeters to about 33.0 millimeters, and a thickness of about 18 millimeters. It may have a coating for enhanced transmission of from four hundred to one thousand nanometers. The fourth lens 61 is double convex having a first convex radius of about 729.3 millimeters and faces the third lens 59. Fourth lens 61 has a second convex radius of about 81.5 millimeters and faces away from the third lens 59 and toward a test area focal plane 65 at which a 3 inch diameter evenly illuminated image of the exit port 19 is utilizable for characterizing a wafer level imaging device 67 which may be a two or three dimensional electronic array.

In operation, and by example in the drawings, assuming that the target slide 21 has two positions and that first and second wheels 31 and 41 each have six positions, a total of 72 combined states can be achieved, and quickly. With proper control electronics and sensors, and with the high speed electronics to simultaneously control the target slide 21 and first and second wheels 31 and 41, as well as to read corresponding outputs created in a wafer level imaging device, a complete test can be performed in a minute. Calibration can occur early and often in the cycle to keep the automatic illumination testing system 11 true to its pre-set standard.

Figure 1:
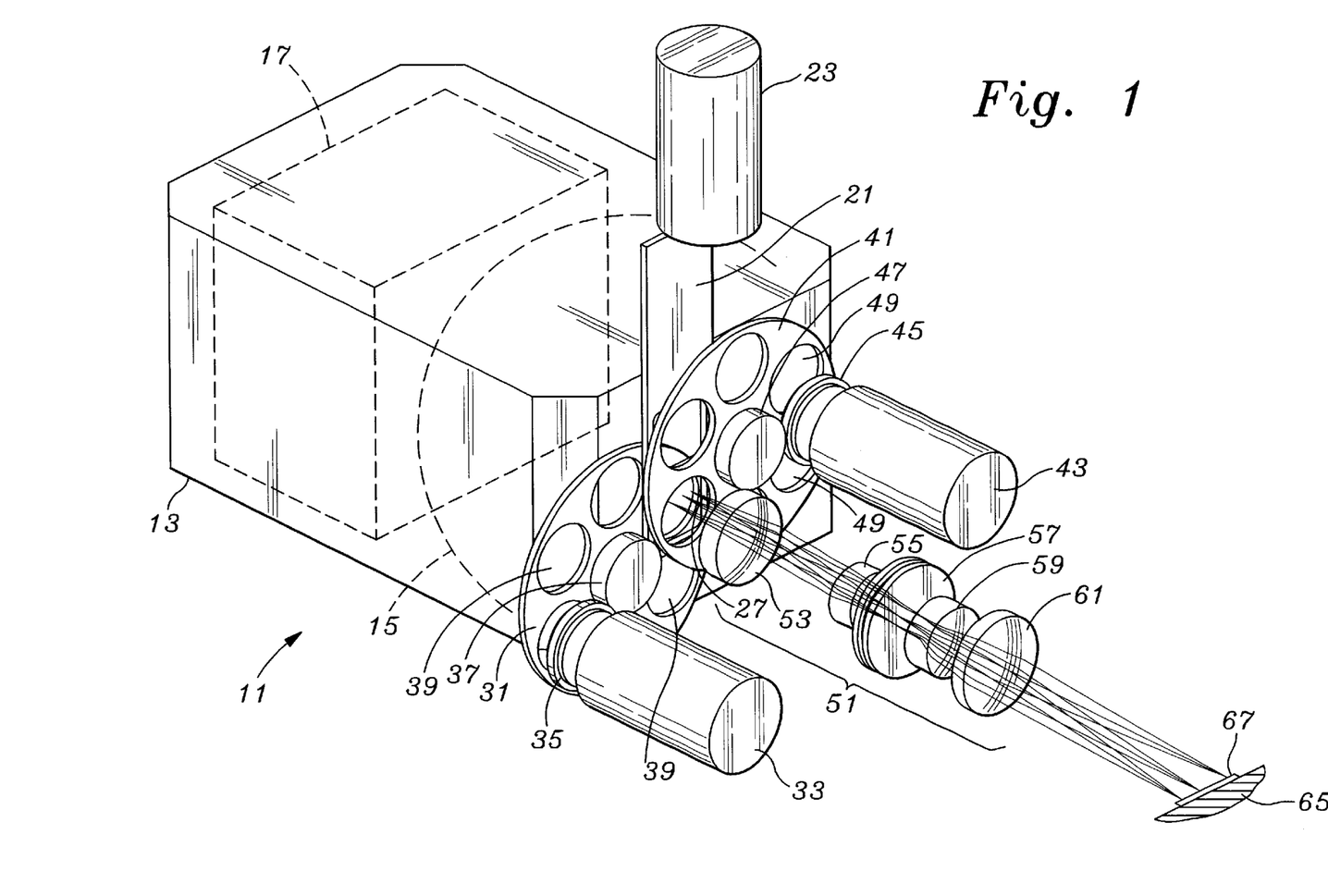
FIG. 1 is a schematic illustration, from a side view, of the illuminator of the invention and illustrating the preferred arrangement of the elements.

In its most simplistic realization, as seen in FIG. 1, the light, after treatment by the lens transfer system 51, is directed to a support 65, or other structure containing a two or three dimensional array 67, and which may hereafter be referred to as a two dimensional array, the term three dimensional array referring to any system which has a depth dependent sensitivity such as by interference, focus, or dimensional location aspect. Once the two dimensional array 67 is positioned on the support 65, the associated electronics 17 can drive the motors 23, 33 & 43 to put the two dimensional array 67 through its test paces automatically.

Figure 2:
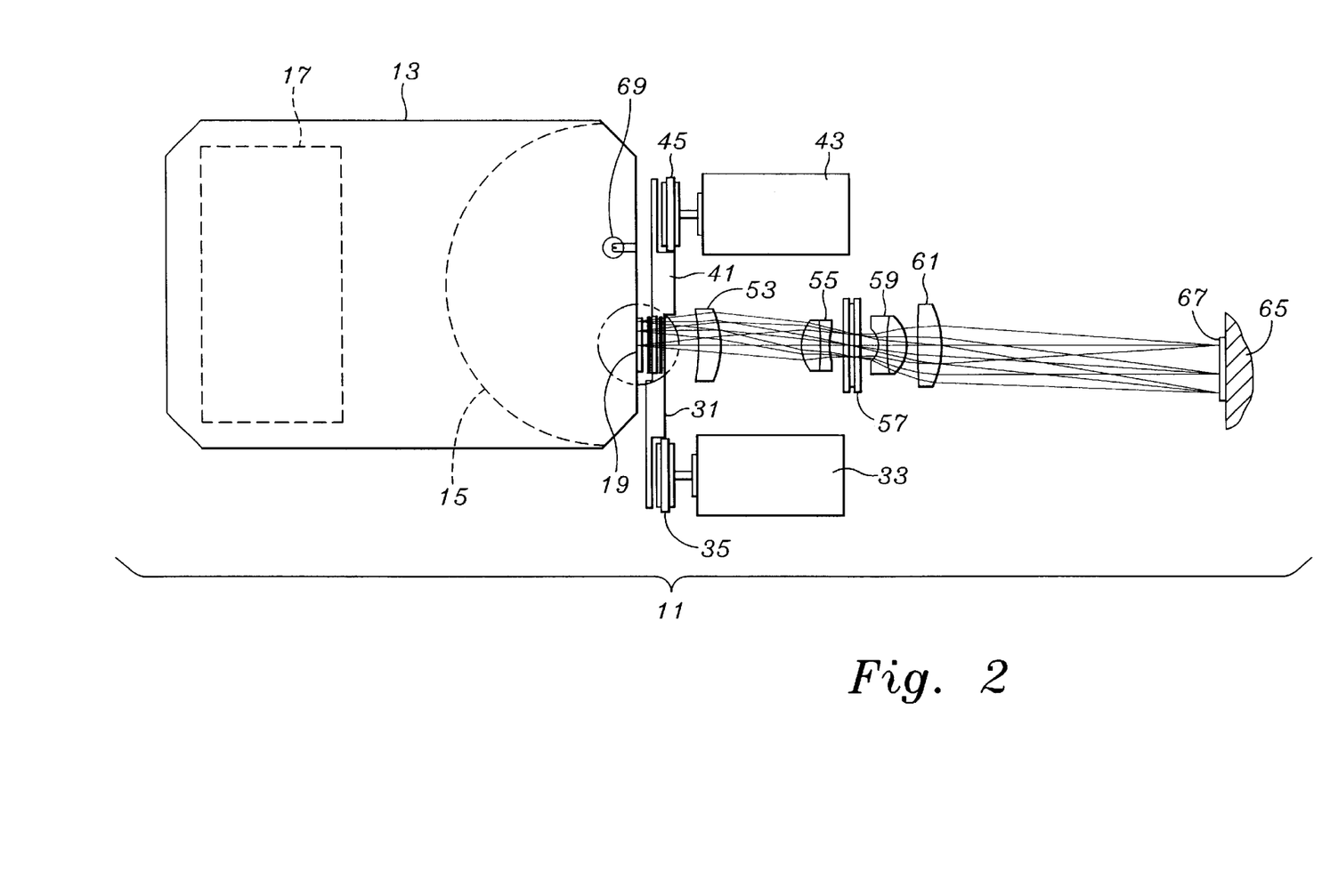
FIG. 2 illustrates a top view of the simplified mechanical embodiment of the automatic illumination testing system 11 seen in FIG. 1.

Referring to FIG. 2, a top view of the simplified mechanical embodiment of the automatic illumination testing system 11 seen in FIG. 1 gives a top down more complete view of the light transmission. A bulb 69 which may preferably be a tungsten halogen or other bulb directs light toward the sphere section 15 and thence through the aperture opening 19. The remainder of the structures of FIG. 2 are the same as was described for FIG. 1.

Figure 3:
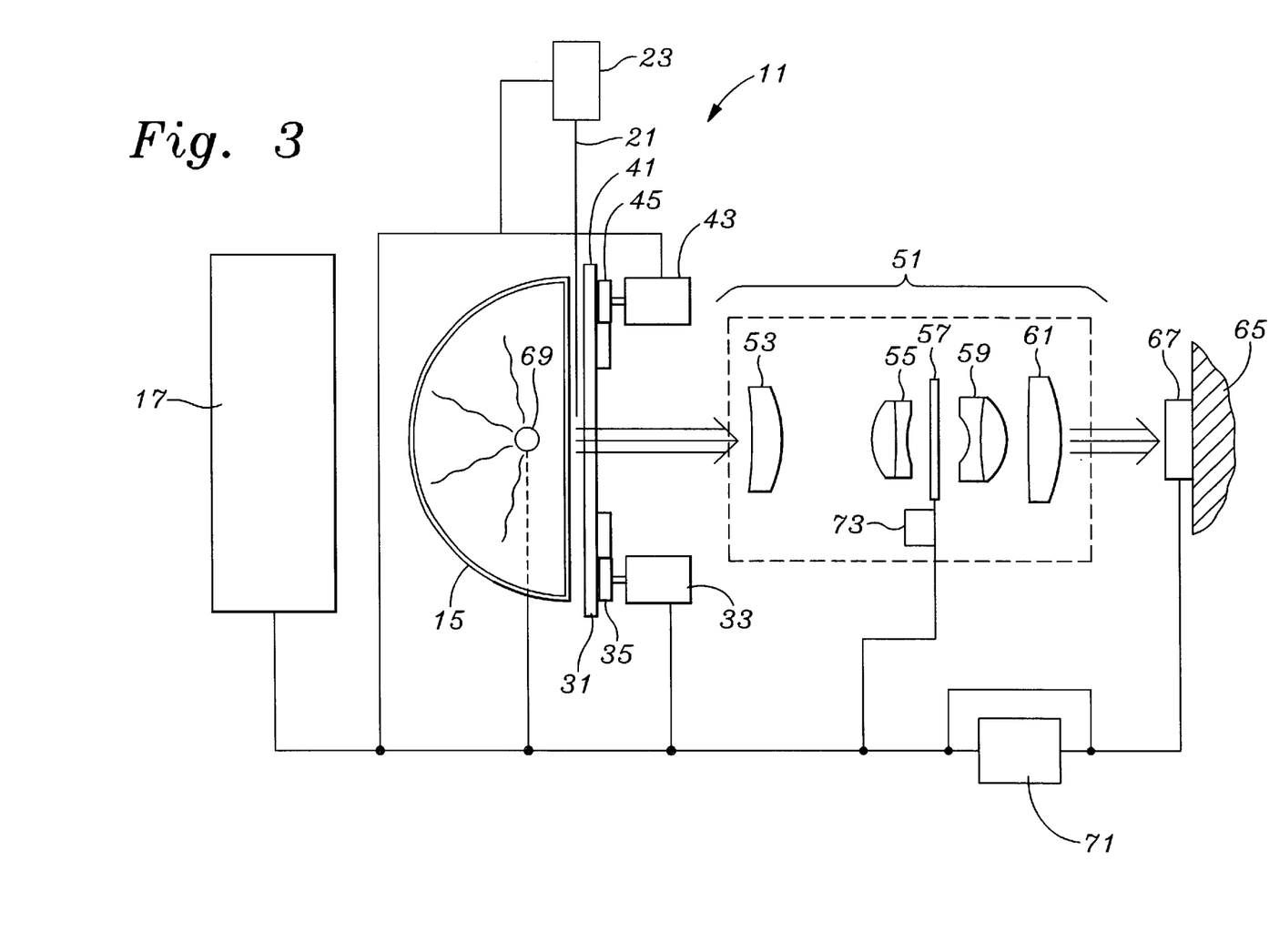
FIG. 3 illustrates a top schematic view of the automatic illumination testing system.

Referring to FIG. 3, a top schematic view of the automatic illumination testing system 11 is seen, but with various electrical connections which enable a wide variety of modes to be realized using the automated circuitry. The two or three dimensional array 67 is connected into electronics 17 either directly or through another computer 71. Where computer 71 is utilized, the computer 71 will typically contain special circuitry for characterizing the array 67. Where the automatic illumination testing system 11 is built as an automated but stand-alone or stand-off system, a working interface between the computer 71, typically more closely associated with the array 67, will be had. Nothing will prevent the computer 71 from being included within or as a part of the electronics 17, especially where it is desired for the automatic illumination testing system 11 to be constructed for direct connection to the array 67. In this case, the automatic illumination testing system 11 is constructed more as a complete testing device. In most cases, the combination of computer 71 and test stand connection to electronics 17 will be either provided by a manufacturer or highly customized to a manufacturer's needs. The automatic illumination testing system 11 will be provided as an integrated unit, but with the capability to communicate with and in some cases be controlled by the computer 71.

As is shown in FIG. 3, the bulb 69, first and second friction drive motors 33 and 43, target slide motor 21, and electronics 17, and a variable aperture motor 73, are all electrically connected in common. The connection of electronics 17 to the computer 71, or optionally directly to the array 67 is also had. This connection scheme enables active testing, as well a temporal aspect testing and calibration.

Where one of the aspects of the array 67 is its reaction time, the time from initial illumination can be tracked with the schematic of FIG. 3. The variable aperture motor 73 can be used to test the reaction of the array 67 to different light levels. Further, where the array 67 is an array which has been thoroughly tested, it can be utilized to calibrate the computer 71 and or the electronics 17 in order to even more finely and accurately perform testing. The use of a finely tested array 67 will enable the electronics 17, likely to contain and include a microprocessor controller, to gauge. the exact output of the bulb 69 and the exact transmissivity of the variable aperture 57 as controlled by the variable aperture motor 73. Other aspects of operation include assessment of the speed at which the motors 23, 33 and 43 operate, as well as perhaps the performance of the sphere section 15. Bulb 69, and motors 23, 33, 43 and 73 can be more exactly controlled.

Figure 4:
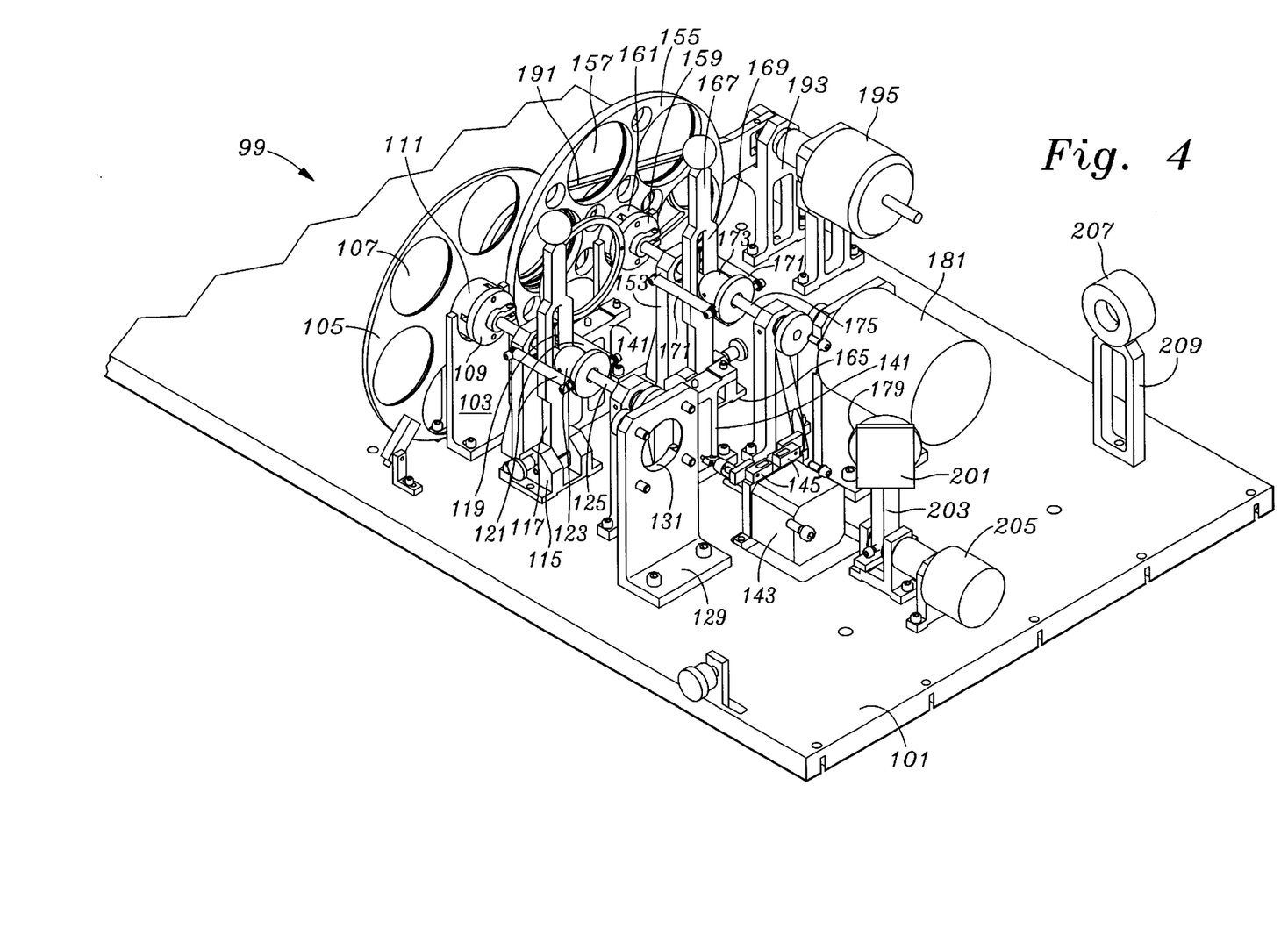
FIG. 4 is a perspective view illustrating one mechanical realization of the mechanical aspects of the invention.

Referring to FIG. 4, a perspective view illustrates one mechanical realization of the mechanical aspects of the invention outside the housing 13 which facilitates quick operability. A quick-change and calibration facilitative assembly 99 shown in FIG. 4 is supported by a base 101. Base 101 supports a stand 103 which rotationally supports a first wheel 105 having apertures 107. An axially de-couplable fitting 109 engages a hub 111 of the wheel 105. A pivotally mounted handle assembly includes a base 115 and pivotally mounted handle 117 having a central aperture 119. A pair of springs 121 flank the outside of the handle 117. A bearing ball 123 rotates on a shaft 125 and the bearing ball 123 is engaged by the handle 117 to disengage the de-couplable fitting 109 from the wheel 105 to facilitate a rapid change of the wheel 109. A motor mount 129 is shown with its motor removed to illustrate that a power shaft would extend through an aperture 131 for mechanical engagement with the shaft 125, and to help better illustrate the working of the assembly 99.

A pair of stands 141 exist for the support of a lens transfer system assembly 51, while a base mounted variable aperture motor 143 has a pair of moveable members 145 to move matching structures on the lens transfer system assembly 51. Also seen is a stand 153 which rotationally supports a second wheel 155 having apertures 157. An axially de-couplable fitting 159 engages a hub 161 of the wheel 155. A pivotally mounted handle assembly includes a base 165 and pivotally mounted handle 167 having a central aperture 169. A pair of springs 171 flank the outside of the handle 167. A bearing ball 173 rotates on a shaft 175 and the bearing ball 173 is engaged by the handle 167 to disengage the de-couplable fitting 159 from the wheel 155 to facilitate a rapid change of the wheel 159. A motor mount 179 is shown with its motor 181 which is the same style motor which would also fit motor mount 109.

A pivoting target slide 191 is shown pivotally mounted to a stand 193 and powered by a motor 195. Rather than vertical displacement, the slide assembly shown uses a simple angular displacement of the pivoting target slide 191. The displacement near the beam path is almost a slide since the pivot axis is so far displaced from the beam path.

Also seen is a target mirror 201 mounted atop a pivoting support 203 and operated by a motor 205. A target ring 207 is supported by a stand 209 and may be used to either support or guide alignment with a test sensor or calibration instrument. In this manner, even without a test array 67, the system 11 can, in an automated fashion, provide a self test. The instrument aligned with the target ring 207 can be widely varied depending upon what aspects of the system 11 are to be tested. One mode of operation would include positioning the mirror 201 to direct light through the target ring 207 during start up each new day of testing, to at least give a cursory indication that the system 11 is functioning properly or to link performance between two days of testing to give better quality assurance.

Figure 5:
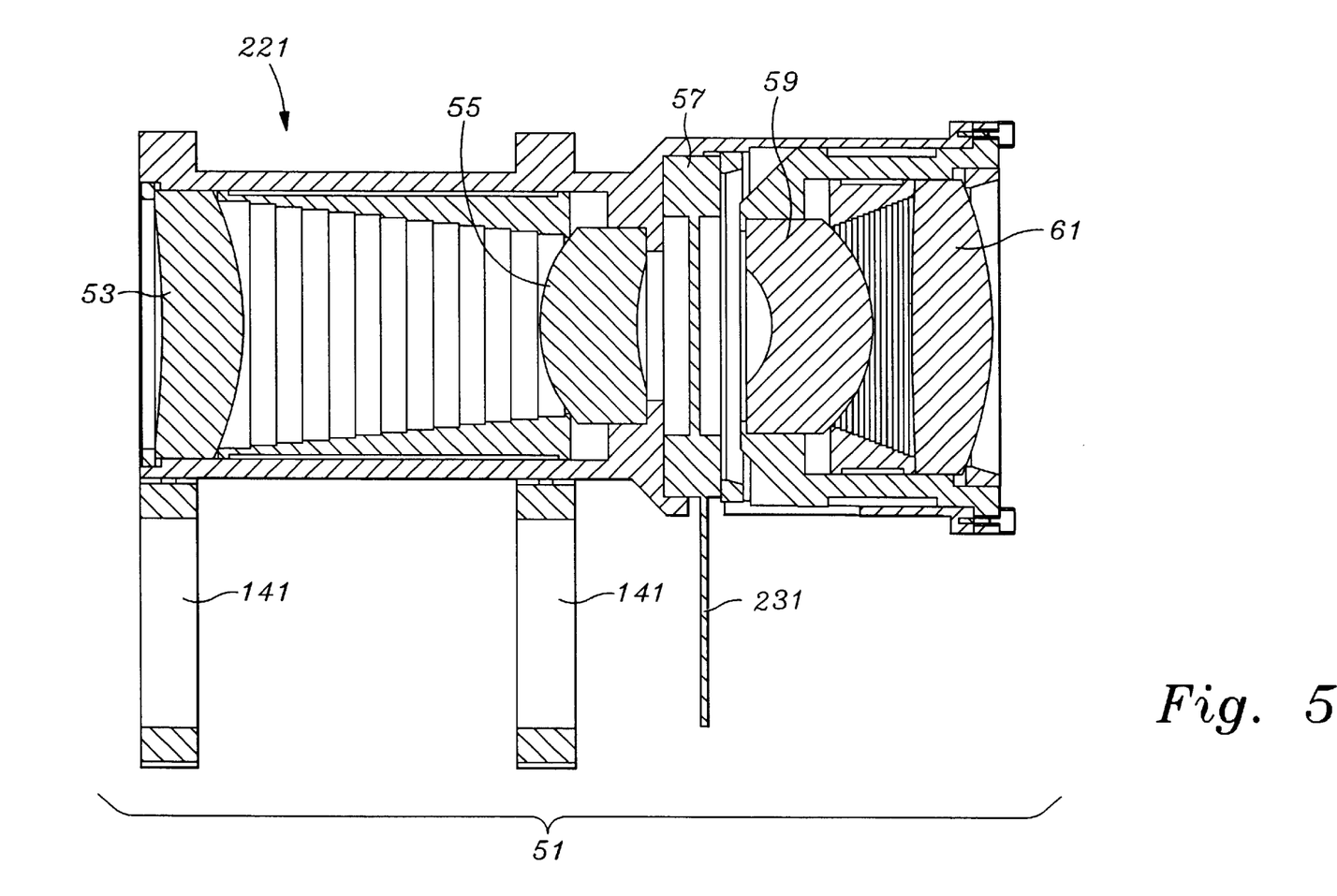
FIG. 5 illustrates a sectional view of an integrated lens transfer system housing.

Referring to FIG. 5, a sectional view of an integrated lens transfer system housing 221 is used to support the lens transfer system 51 lenses 53, 55, 59, and 61 , as well as the variable aperture 57. The housing 121 is shown atop the supports 141, and a mechanical extension 231 is seen extending downward for engagement with the pair of moveable members 145 for actuation of the variable aperture 57.

While the present invention has been described in terms of a illuminator system for automatically testing two or three dimensional arrays, one skilled in. the art will realize that the structure and techniques of the present invention can be applied to many similar optical appliances. The present invention may be applied in any situation where light density is to be concentrated, diffused and then used to illuminate a target area, and where an automatic testing sequence is desired to reduce time in testing, enable calibration and increase statistical quality control.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An automatic illuminator test system for producing light having high spatial uniformity comprising:

a housing having an exit aperture;

a reflector oriented to pass light through said exit aperture;

a lamp located with respect to said reflector to direct light against said reflector for producing light output in a first direction toward said exit aperture;

at least one structure having a plurality of light transmissive apertures mounted adjacent said exit aperture and which are selectably positionable in front of said exit aperture;

an array to be tested;

an image transfer system in optical alignment with said at least one structure having a plurality of light transmissive apertures for focussing light onto an image plane for casting light onto at least a two dimensional array; and a control system connected to said array to be tested and connected to and for controlling said at least one structure having a plurality of light transmissive apertures to automatically select a pre-specified one of said light transmissive apertures to align with light leaving said exit port and propagating through said image transfer system based upon an electrical signal from said array to be tested.

2. The automatic illuminator test system as recited in claim 1 wherein said at least one structure having a plurality of light transmissive apertures mounted adjacent said exit aperture is a first wheel rotatably supported adjacent said housing and mechanically connected to a first motor, said first motor connected to said control system.

3. The automatic illuminator test system as recited in claim 2 wherein said at least one structure having a plurality of light transmissive apertures mounted adjacent said exit aperture also includes a second wheel rotatably supported adjacent said housing and mechanically connected to a second motor, said second motor connected to said control system and controllable independently of said first motor.

4. The automatic illuminator test system as recited in claim 3 wherein said first wheel light transmissive apertures contain at least one of neutral density filters and frequency selective filters.

5. The automatic illuminator test system as recited in claim 1 wherein said image transfer system includes a variable aperture for controlling the amount of light passing through said image transfer system.

6. The automatic illuminator test system as recited in claim 5 and further comprising a variable aperture motor in controlling connection with said variable aperture for enabling remote control the amount of light passing through said image transfer system.

7. The automatic illuminator test system as recited in claim 6 wherein said variable aperture motor is controllably connected to said control system.

8. An automatic illuminator test system for producing light having high spatial uniformity comprising:

a housing having an exit aperture;

a reflector oriented to pass light through said exit aperture;

a lamp located with respect to said reflector to direct light against said reflector for producing light output in a first direction toward said exit aperture;

at least one structure having a plurality of light transmissive apertures mounted adjacent said exit aperture and which are selectably positionable in front of said exit aperture;

an image transfer system in optical alignment with said at least one structure having a plurality of light transmissive apertures for focussing light onto an image plane for casting light onto at least a two dimensional array, and wherein said image transfer system further comprises:
- a first lens in optical alignment with said exit port having a concave surface facing said exit aperture, and a convex surface opposite said concave surface;
- a second lens in optical alignment with said first lens and having a convex surface facing said first lens and a concave surface opposite said convex surface of said second lens;
- a third lens in optical alignment with said second lens and having a concave surface facing said second lens and a convex surface opposite said concave surface of said third lens;
- a fourth lens in optical alignment with said third lens and having a first convex surface facing said third lens and a second convex surface opposite said first convex surface of said fourth lens, said fourth lens for casting highly uniform light onto a plane; and a control system for controlling said at least one structure having a plurality of light transmissive apertures to automatically select a pre-specified one of said light transmissive apertures to align with light leaving said exit port and propagating through said image transfer system.

9. The automatic illuminator test system as recited in claim 8 wherein said image transfer system also includes a variable aperture, located between said second and said third lens, for controlling the amount of light passing through said image transfer system.

10. The automatic illuminator test system as recited in claim 9 wherein said control system is also controllably connected to said lamp.

11. The automatic illuminator test system as recited in claim 1 wherein said control system is also controllably connected to said lamp.

12. An automatic illuminator test system for utilizing light having high spatial uniformity to test arrays comprising:
- a light source having a light exit port;
- at least one structure having a plurality of light transmissive apertures mounted in alignment with said exit port and which are selectably positionable in front of said exit port;
- an image transfer system in optical alignment with said at least one structure having a plurality of light transmissive apertures for focussing light onto an image plane for casting light onto at least a two dimensional array; and
- a control system for controlling at least one of said at least one structure having a plurality of light transmissive apertures to automatically select a pre-specified one of said light transmissive apertures to align with light leaving said exit port and propagating through said image transfer system and an intensity of light produced by said light source and including at least a microprocessor and an array to be tested electrically connected to said microprocessor.

13. The automatic illuminator test system as recited in claim 12 wherein said control system also includes a computer, and wherein said at least a microprocessor for interfacing with said computer.

14. The automatic illuminator test system as recited in claim 12 wherein said at least one structure having a plurality of light transmissive apertures mounted in alignment with said exit port is a first wheel rotatably supported adjacent said housing and mechanically connected to a first motor, said first motor connected to said control system.

15. The automatic illuminator test system as recited in claim 14 wherein said at least one structure having a plurality of light transmissive apertures mounted in alignment with said exit port also includes a second wheel rotatably supported adjacent said housing and mechanically connected to a second motor, said second motor connected to said control system and controllable independently of said first motor.

16. The automatic illuminator test system as recited in claim 14 and further comprising means for quickly de-coupling and re-coupling said first wheel from its said mechanical connection to said first motor, to facilitate substitution of said first wheel.

17. The automatic illuminator test system as recited in claim 15 and further comprising means for quickly de-coupling and re-coupling said first and said second wheels from their said mechanical connection to said first and said second motor, respectively, to facilitate substitution of said first and second wheels.

* * * * *